United States Patent
Wu

(10) Patent No.: US 7,313,527 B2
(45) Date of Patent: Dec. 25, 2007

(54) REGISTERING AN UTTERANCE AND AN ASSOCIATED DESTINATION ANCHOR WITH A SPEECH RECOGNITION ENGINE

(75) Inventor: Gansha Wu, Liu Fang Nan Li (CN)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 10/350,484

(22) Filed: Jan. 23, 2003

(65) Prior Publication Data

US 2004/0148173 A1 Jul. 29, 2004

(51) Int. Cl.
*G10L 11/00* (2006.01)

(52) U.S. Cl. .................. 704/270.1; 704/275; 704/231; 704/270

(58) Field of Classification Search ................ 704/270, 704/270.1, 271–272, 275, 231, 243, 251, 704/252
See application file for complete search history.

(56) References Cited

U.S. PATENT DOCUMENTS

| | | | |
|---|---|---|---|
| 5,732,393 A | 3/1998 | Aoshima | |
| 5,774,628 A | 6/1998 | Hemphill | |
| 5,819,220 A | 10/1998 | Sarukkai et al. | |
| 5,845,074 A | 12/1998 | Kobata | |
| 5,915,001 A | 6/1999 | Uppaluru | |
| 5,918,223 A | 6/1999 | Blum et al. | |
| 5,960,399 A | 9/1999 | Barclay et al. | |
| 5,963,965 A | 10/1999 | Vogel | |
| 6,101,472 A * | 8/2000 | Giangarra et al. | .......... 704/275 |
| 6,101,473 A | 8/2000 | Scott et al. | |
| 6,282,512 B1 * | 8/2001 | Hemphill | ................ 704/270.1 |
| 6,311,182 B1 | 10/2001 | Colbath et al. | |
| 2001/0034603 A1 | 10/2001 | Thrift et al. | |

FOREIGN PATENT DOCUMENTS

JP 10124293 5/1998

OTHER PUBLICATIONS

In re Philip R. Thrift and Charles T. Hemphill, United States Court of Appeals for the Federal Circuit, 01-1445 (U.S. Appl. No. 08/418,229), Decided: Aug. 9, 2002.

* cited by examiner

*Primary Examiner*—Huyen X. Vo
(74) *Attorney, Agent, or Firm*—Blakely, Sokoloff, Taylor & Zafman LLP

(57) ABSTRACT

A method for registering an utterance and an associated destination anchor with a speech recognition engine. The method includes getting a list of all nodes with links in a document being displayed by a browser by using a programmatic interface provided by the browser. For each node in the list of all nodes, the method gets a destination anchor for the node. If the destination anchor exists, the method forms the utterance by recursively collecting text from subnodes of the node. The utterance and the destination anchor a registered with the speech recognition engine.

12 Claims, 5 Drawing Sheets

```
    var linkText, linkHref, linkPos;

function registerLinksToGrammar() { var nodeList;

// Get all nodes with links
100   nodeList = document.links;

linkText = new Array(nodeList.length);
      linkHref = new Array(nodeList.length);
      linkPos  = new Array(nodeList.length);

102   for (var i = 0; i < nodeList.length; i++) {

// Get HREF node for each node
104     linkHref[i] = nodeList[i].getAttribute("HREF");

// If HREF exists get link parameters for grammar engine
106     if (linkHref[i]) {

// Get text or alternate text from subnodes
108       linkText[i] = getLinkText(nodeList[i]);

// Get position of link
110       linkPos[i] = getLinkPos(nodeList[i]);

// Add visible tags to links
112       insertTag(i);

// Register text, index, href, and
          //   position of link with grammar engine
114       registerToGrammar(linkText[i], i, linkHref[i], linkPos[i]);
        }
      }
      return true;
    }
```

FIG. 2

```
// Recursively traverse subnodes of link node to
// gather text and alternate text function getLinkText(node) {

TEXT_NODE = 3;
    var linkText = "", linkAlt = "", linkNodes, subnode;

200 —    linkNodes = node.childNodes;
202 —    for (var i = 0; i < linkNodes.length; i++) {
             subnode = node.childNodes[i];
204 —        if (subnode.nodeType == TEXT_NODE) {
                 linkText = linkText + subnode.nodeValue;
             } else {
206 —            linkText = linkText + getLinkText(subnode);
                 if ((subnode.tagName == "IMG") ||
                     (subnode.tagName == "AREA"))
      208 —         linkAlt = subnode.getAttribute("ALT");
             }
         }

// Use regular expression to test for blank text
    // If no text use ALT text
            re = /^\s*$/;
210 —       if (re.test(linkText)) linkText = linkAlt;

return (linkText);
}
```

FIG. 3

```
// Add visible tags to links to provide speakable link function insertTag(index) {
    var container;
    if (linkPos[index].absolute == true)
300 —    container = document.body;
         else
302 —    container = linkPos[index].parent;

304 —    container.insertAdjacentHTML("beforeEnd",
             "<DIV CLASS=TAGTAG ID=TAGTAG_" + index + " STYLE='left:"
             + linkPos[index].x + ";top:" + linkPos[index].y
             + ";width:10;height:10'>" + index + "</DIV>");
}
```

FIG. 4

```
        // Get position of link function getLinkPos(node) {
400 ─┐     var pos = new Object;
            pos.absolute = true;
            pos.x = 0;
            pos.y = 0;
            pos.parent = null;

var element = node;
402 ─┐     while ( element.offsetParent) {
  404 ─┐     var parent = element.offsetParent;
              var parent_is_hidden = false;
  406 ─┐     if (parent.style.visibility == "hidden") {
                  //e.g., some menus
                  // make it visible first to get position info
      408 ─┐     parent.style.visibility = "visible";
                  parent_is_hidden = true;
              }
  410 ─┐     if (parent.tagName == "DIV") {
                  //what we need is a related position to DIV
       412 ─┐    pos.absolute = false;
                  pos.parent = parent;
                  return pos;
              } else {
       414 ─┐    pos.x += element.offsetLeft;
                  pos.y += element.offsetTop;
              }
   416 ─┐    if (parent_is_hidden) {
                  parent.style.visibility = "hidden";
              }
   418 ─┐    element = parent;
           } return pos;
        }
```

FIG. 5

```
    // Style for visible tags
    <style><!--
    .TAGTAG {filter:alpha(opacity=65); cursor:help;
    background:yellow; color:red; position:absolute;
    font:italic 7pt Arial; visibility:inherit;}
    -->
    </style>
```

FIG. 6

REGISTERING AN UTTERANCE AND AN ASSOCIATED DESTINATION ANCHOR WITH A SPEECH RECOGNITION ENGINE

BACKGROUND OF THE INVENTION

The Worldwide Web (Web) provides a vast collection of documents that can be accessed via the internet. Many of the documents on the Web include hyperlinks that allow the user to jump to other points within the document, to other documents, and to other resources. A common access method for Web documents is via a computer that provides a visual display of the document and provides for input from the user through a keyboard and a pointing device such as a mouse. The user may use the hyperlinks by selecting them with the pointing device.

Other methods may be used to provide access to Web documents. In particular, voice recognition may be used as an input in lieu of or in addition to a keyboard or pointing device. Voice recognition may allow effective interaction with display-based Web documents where the mouse and keyboard may be missing or inconvenient. This may be useful to people with visual impairments or needing Web access while keeping theirs hands and eyes free for other things.

Voice recognition may require identifying utterances captured from the user by using a speech recognition grammar that defines the valid utterances. The fixed commands of the browser such as "Home" and "Back" are readily identified for inclusion in the speech recognition grammar. The grammar for selecting hyperlinks is not as readily defined as the fixed commands. Speech recognition for selecting hyperlinks in Web documents may differ from other speech recognition requirements because the utterances may be single words or short phrases spoken without a larger context. Some hyperlinks in Web documents may be represented by images or icons rather than text.

The World Wide Web Consortium (W3C) is developing a Voice Extensible Markup Language (VoiceXML) to permit authoring of Web documents intended for use with a Voice Browser that provides an aural presentation and accepts spoken input. VoiceXML documents provide information specifically designed to define the permissible spoken input to be included in the speech recognition grammar.

An extremely large number of Web documents have been authored without consideration of the requirements for selecting hyperlinks by spoken input. It would be desirable to enable a Web browser to respond to spoken utterances to select hyperlinks in Web documents that have not been authored to define the permissible spoken input.

BRIEF DESCRIPTION OF THE DRAWINGS

FIG. 2 shows exemplary software routine for a speech navigation parser to register hyperlinks with a speech recognition engine.

FIG. 3 shows an exemplary getLinkText function that may be used by the software routine of FIG. 2.

FIG. 4 shows an exemplary insertTag function that may be used by the software routine of FIG. 2.

FIG. 5 shows an exemplary getLirikPos function that may be used by the software routine of FIG. 2.

FIG. 6 shows an exemplary style to provide a translucent tag with red text on a yellow background.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention. The present invention includes various steps, which will be described below. The steps of the present invention may be embodied in machine-executable instructions, which may be used to cause a general-purpose processor programmed with the instructions to perform the steps. Alternatively, the steps may be performed by a combination of hardware and software. The machine-executable instructions may be stored or transmitted by a computer readable medium such as a magnetic or optical disc.

The speech navigation parser uses a programmatic interface provided by the Web browser. The programmatic interface may include a set of objects that represent Web documents, a model of how these objects can be combined, and an standard interface for accessing and manipulating them. An exemplary programmatic interface is the Document Object Model (DOM) defined by the World Wide Web Consortium (W3C). While the DOM will be used as an exemplary programmatic interface in the description of the speech navigation parser, it will be appreciated that programmatic interfaces provided by a Web browser other than DOM can be used to implement the speech navigation parser.

The speech navigation parser has control after a new Web document has been received and processed by the Web browser. The speech navigation parser may be a plug-in to the Web browser that registers an event to cause the Web browser to pass control to the speech navigation parser when a Web document has been received and processed.

The speech navigation parser uses the programmatic interface of the browser to extract all the hyperlinks in the newly received Web document. The speech navigation parser extracts and/or creates speakable utterances that can be used to select the hyperlinks. The speech navigation parser registers the hyperlinks and the speakable utterances with a speech recognition engine. The speech navigation parser may add visible tags to the hyperlinks in the Web document to provide a concise utterance that can be used to select the hyperlink.

The information registered by the speech navigation parser allows a speech recognition engine to identify a spoken utterance by using the registered speakable utterances as all or part of a valid grammar. The information registered by the speech navigation parser also allows the speech recognition engine to instruct the browser to respond to the selection of the hyperlink associated with the spoken utterance by the speech navigation parser.

Figure 1:
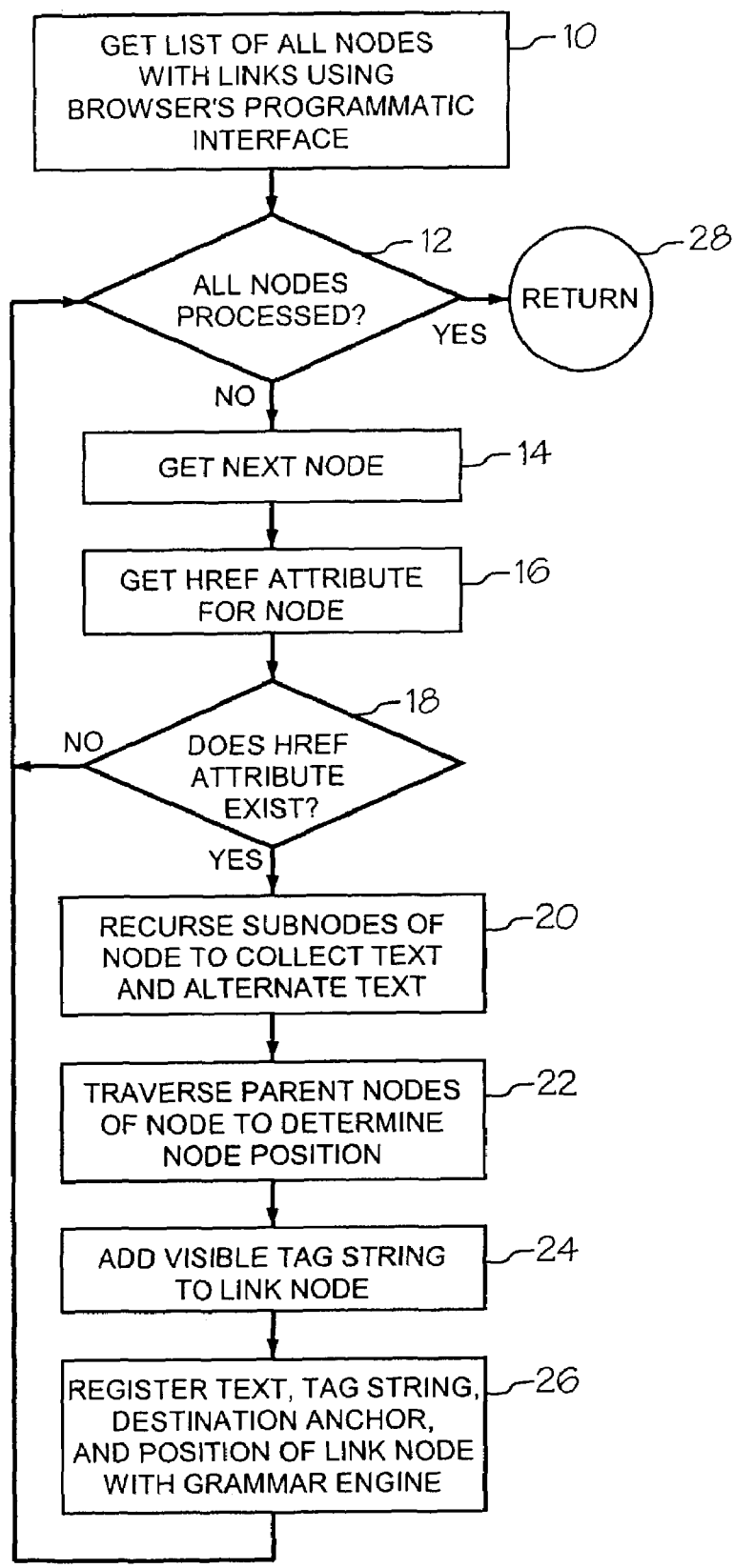
FIG. 1 is a flowchart for an embodiment of the invention.

FIG. 1 is a flowchart for an embodiment of the invention. The programmatic interface of the browser is used to obtain a list of all nodes with links 10. Each node in the list is processed in turn until all node are processed 12. The node to be processed is obtained from the list 14 and the HREF attribute for the node 16 is retrieved. A hyperlink node may or may not have an HREF attribute since the HREF attribute can be supplied after the Web document is initially loaded. If the node does not have an HREF attribute 18, processing of the node may end and the next node, if any, processed. In other embodiments, a hyperlink node that does not have an HREF attribute may be registered with a null URI or may be registered when an HREF attribute is added to the hyperlink node. If the node has an HREF attribute, the subnodes of the node are recursively examined to collect the text and alternate text associated with the link 20. The parent nodes are examined to obtain the cumulative offset of the node and thereby determine the node position in the document 22. Parent nodes are successively examined until the root node is reached indicating the position is absolute or until a container (DIV) node is reached indicating that the position is relative to the container node. The position information may include x and y offsets, absolute/relative flag, and node the offsets are relative to. A visible tag string may be added to the document in the vicinity of the position of the link node 24 to ensure there will be a speakable utterance that can be used to select the link. The node text, tag string, destination anchor, and link node position may be registered with a grammar engine 26. The grammar engine may respond to spoken utterances of the node text or tag string by causing the browser to navigate to the associated destination anchor as registered. When all link nodes in the node list have been processed 12, the processing ends and control is returned to the caller 28.

FIG. 2 shows an exemplary software routine for a speech navigation parser to register hyperlinks with a speech recognition engine. The embodiment shown uses the DOM programmatic interface. DOM represents a document as nodes with a hierarchical structure. A list of the nodes that represent hyperlinks is provided by the document links object 100.

The exemplary routine shown in FIG. 2 registers the hyperlink text, a tag value that provides an alternate utterance, the Uniform Resource Identifier (URI), and the position of the hyperlink with a speech recognition engine. To simplify the exemplary routine, the values that would be registered with the speech recognition engine are stored in an array. In a preferred embodiment, the speech recognition engine would create and populate a data structure to store the registered information. The registered information data structure may contain registered information from more than one Web document.

The exemplary routine of FIG. 2 uses a for loop 102 to examine each node in the node list of hyperlinks. The URI of a hyperlink node is maintained by the HREF attribute. The HREF attribute may be obtained by using the getAttribute("HREF") procedure 104 for the hyperlink node. In the exemplary routine a hyperlink node that does not have an HREF attribute at the time the Web document is loaded is ignored 106.

The DOM maintains text in separate nodes associated with element nodes. The hyperlink node is an element node and the text, if any, associated with the hyperlink node will be in associated text nodes. The exemplary routine of FIG. 2 uses a getLinkText function 108 to obtain the text associated with each hyperlink node.

The exemplary routine of FIG. 2 uses a getLinkPos function 110 to obtain the position of the hyperlink in the Web document. In other embodiments, the speech navigation parser may not obtain or register position information.

The exemplary routine of FIG. 2 uses an insertTag function 112 to create a visible tag that provides an alternate utterance for selecting the hyperlink. In the exemplary routine the array index is used as the tag and every hyperlink is tagged. In other embodiments other schemes may be used to provide the tags. The speech recognition engine may generate the tags and return the tag to the speech navigation parser when the hyperlink is registered. The tags may be checked for conflicts with text associated with the hyperlinks. Tags may be applied only to hyperlinks that do not have visible text. For a graphic link that uses an IMG element, the tag may be alternate text provided by an alt attribute of the IMG element.

The exemplary routine of FIG. 2 uses a registerToGrammar function 114 to register the information obtained from the Web document with the speech recognition engine. The exemplary routine registers the hyperlink text, linkText, a tag value that provides an alternate utterance, i, the URI, linkHref, and the position of the hyperlink, linkPos. As discussed above different information may be registered by other embodiments of the invention.

FIG. 3 shows an exemplary getLinkText function that may be used by the software routine of FIG. 2. The exemplary getLinkText function recursively traverses the subnodes of a provided link node to gather the text and alternate text associated with the link node. In the DOM, the link element node may have a plurality of child text nodes and may have a plurality of child element nodes. Each child element node may have a plurality of child text nodes and may have a plurality of child element nodes, and so on. Therefore DOM requires a depth first recursive tree search to collect the text of a hyperlink. For example, if the hyperlink was "Create Your Submission" with "Your" in bold, the hyperlink element node would have three child nodes. The first child node would be a text node with the text "Create." The second child node would be a bold element node with a child text node "Your." The third child node would be a text node with the text "Submission." The exemplary getLinkText function would return the text "Create Your Submission."

The exemplary getLinkText function obtains a list of the child nodes of the provided node 200. A for loop 202 is used to traverse each child node in the list. If the child node is a text node 204 the text of the child node is appended to the text string being formed. If the child node is not a text node the text string returned by a recursive call to getLinkText is appended to the text string being formed 206. If a non-text node is an IMG element node or an AREA element node, the alternate text is obtained from the node 208. When the traverse is complete, the text string collected from the child nodes of the link node is tested to see if it contains blank text and, if so, the text string is replaced by the alternate text 210. The exemplary getLinkText function may return a text string that will be displayed by the browser, an alternate text string that may or may not be displayed by the browser, or a null text string. In other embodiments of the invention, the type of text string returned may be provided.

FIG. 5 shows an exemplary getLinkPos function that may be used by the software routine of FIG. 2. The exemplary getLinkPos function traverses the parents of the link node to determine the position of the link in the Web document. The position may be an absolute position within the page or a position that is relative to a parent node. The exemplary getLinkPos function creates a position object for the provided node 400. The position object includes a flag to indicate if the position is absolute, x and y coordinates of the position, and the parent node for a relative position.

A while loop 402 is used to traverse through the parents of the provided link node. The parent of node being examined is obtained 404. If the parent is hidden 406, the parent is temporarily made visible 408 so that position information may be obtained and a flag is set to indicate that the parent needs to be hidden. If the parent is a DIV element 410, the position of the link node is relative and not absolute 412. The parent DIV element is set as the parent node for a relative position and the position relative to the parent DIV element is returned. If the parent element is not a DIV element, the x and y coordinates of the position are incremented by the offset of the parent element 414. If the parent was hidden 416, the hidden attribute is restored. The parent is then set to the element 418. If the parent as the new element has a parent 402 the while loop iterates to continue the traverse of the parent nodes. If the traverse reaches the root node, a node without a parent, without encountering a DIV element, the position is an absolute offset from the 0, 0 origin of the root node.

FIG. 4 shows an exemplary insertTag function that may be used by the software routine of FIG. 2. The exemplary insertTag function uses the DOM interface to add visible tags to the link nodes. Hyperlinks may or may not display an utterable text. Tags may be inserted by the speech navigation parser to ensure that an utterance is always available to allow a spoken selection of a hyperlink.

The exemplary insertTag function uses the index of a hyperlink within the arrays created by the registerLinksTo-Grammar function as the tag value. A container is defined to hold the tag. If the position is absolute, the container is the Web document body 300. If the position is not absolute, the container is the parent node 302 as determined by the getLinkPos function. A DIV element is added to the defined container and placed in the class TAGTAG 304. The DIV element is positioned within the container using the offset coordinates as determined by the getLinkPos function. A TAGTAG style may be added to the Web document to provide the desired visual attributes for the tag. An exemplary style is shown in FIG. 6 to provide a translucent tag with red text on a yellow background. The visibility of the tag is inherited so that tags within hidden containers will be hidden until the container becomes visible.

Figure 7:
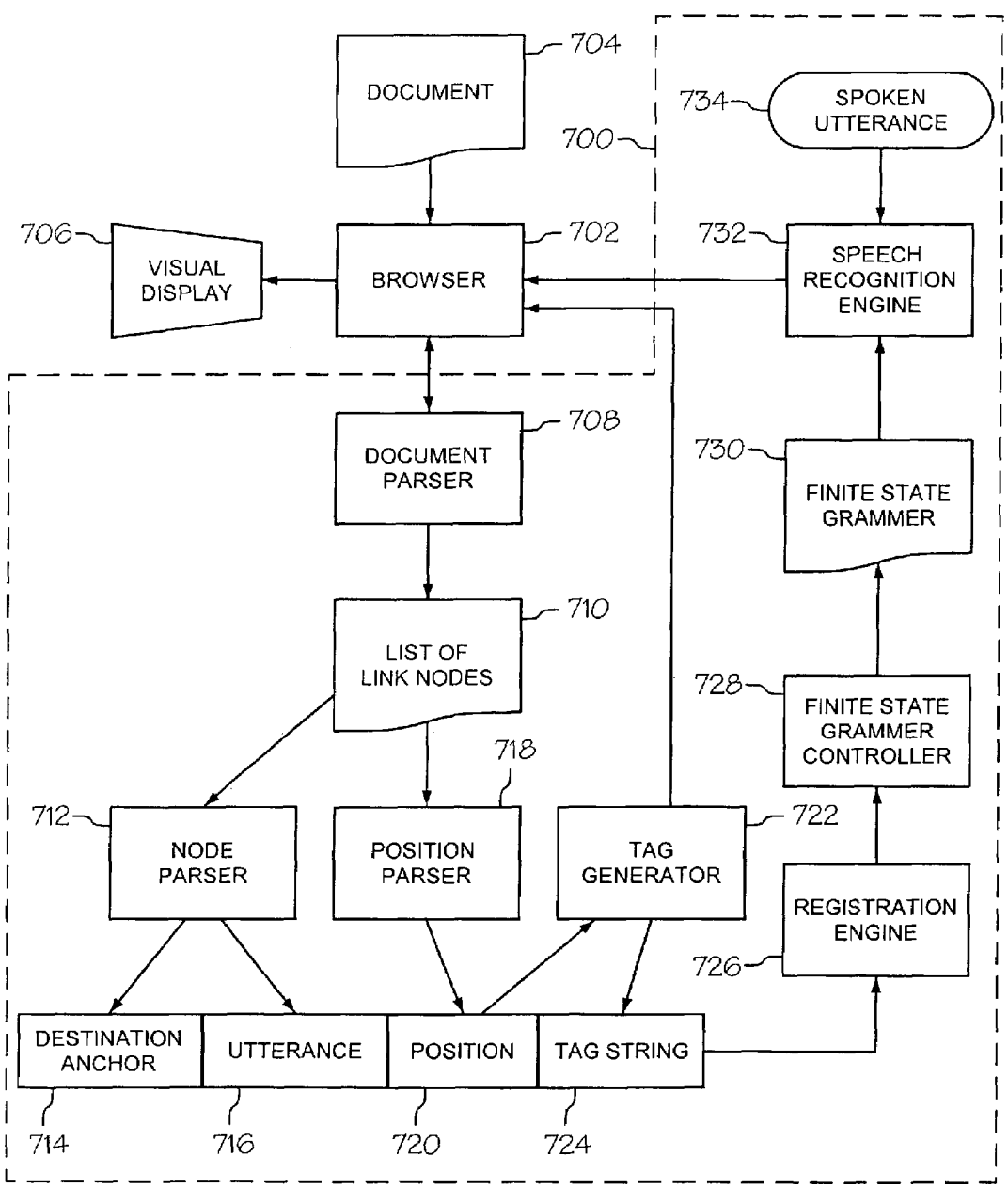
FIG. 7 is a block diagram of an exemplary speech recognition system.

FIG. 7 shows an exemplary speech recognition system 700 that includes an embodiment of the invention. The speech recognition system 700 is coupled to a browser 702 that receives a hypertext document 704 and creates a visual display 706 based on the hypertext document.

The speech recognition system 700 includes a document parser 708 to create a list of all nodes with links 710 by using a programmatic interface provided by the browser 702. A node parser 712 processes each node in the list of link nodes 710. The node parser extracts a destination anchor 714 for each node. If the destination anchor exists, the node parser recursively collects text from subnodes of the node to form an utterance 716 that is associated with the destination anchor 714. The node parser may further recursively examine the subnodes of the node for alternate text and use the alternate text as the utterance 716 if the collected text is blank.

The speech recognition system 700 may include a position parser to traverse parent nodes of the node and to accumulate position offsets to obtain a position 720 of the node. The position parser may mark the position of the node as relative to a container node if the container node is a parent node of the node, otherwise the position of the node is marked as absolute. The position parser may temporarily make the parent node visible if the parent node is hidden to allow the position to be obtained. The speech recognition system 700 may include a tag generator 722 to add a visible tag string 724 in the vicinity of the position of the node 720 by using the programmatic interface of the browser 702.

The speech recognition system 700 includes a registration engine 726 to register the utterance 716 and the destination anchor 714 with a finite state grammar controller 728. The registration engine may also register the position of the node 720 and the visible tag string 724 with the finite state grammar controller. The finite state grammar controller creates a finite state grammar 730.

A speech recognition engine 732 receives a spoken utterance 734 from a user of the speech recognition system 700. The speech recognition engine uses the finite state grammar 730 to identify the spoken utterance 734 and retrieve the destination anchor 714 associated with that utterance. The speech recognition engine uses the programmatic interface of the browser 702 to direct the browser to the destination anchor. This will produce the same effect as the user using a pointing device to visually select the destination anchor on the visual display 706. The speech recognition engine is able to recognize the spoken utterance 734 with good accuracy because the finite state grammar 730 is based on a very limited set of utterances 716 extracted from the text that appears in the document 704 that creates the visual display 706 and possibly on visible tag strings 724 that have been added to the visual display by the tag generator 722.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. It will be recognized that the invention may be carried with the DOM programmatic interface in ways other than the one shown in the exemplary embodiment and that there may be variations in type and format of the information provided by the invention. It will also be recognized that the invention may be implemented with other programmatic interfaces provided by a browser that allow a Web document to be accessed in a manner comparable to that provided by the DOM programmatic interface.

What is claimed is:

1. A method for causing a browser to navigate to a destination anchor in a hypertext document in response to a spoken utterance, the method comprising:
   getting a list of all nodes with links in the hypertext document being displayed by the browser by using a programmatic interface provided by the browser;
   for each node in the list of all nodes,
      getting a destination anchor for the node;
      if the destination anchor exists, forming an associated utterance by recursively collecting text from subnodes of the node;
      traversing parent nodes of the node and accumulating position offsets to obtain a position of the node;
      marking the position of the node as relative to a container node if the container node is a parent node of the node, otherwise marking the position of the node as absolute; and
      registering the associated utterance, the destination anchor, and the position of the node with a speech recognition engine;
   receiving the spoken utterance from a user;
   identifying the associated utterance that corresponds to the spoken utterance;
   retrieving the destination anchor associated with the identified associated utterance; and
   directing the browser to the retrieved destination anchor.

2. The method of claim 1, wherein forming the utterance further comprises recursively examining the subnodes of the node for alternate text and using the alternate text as the utterance if the collected text is blank.

3. The method of claim 1, wherein the parent node is temporarily made visible if the parent node is hidden.

4. The method of claim 1, further comprising adding a visible tag string in the vicinity of the position of the node and further registering the visible tag string with the speech recognition engine.

5. An article of manufacture comprising a computer-readable medium having a sequence of instructions, the sequences of instructions, when executed by a processor, causing the processor to perform a method for causing a browser to navigate to a destination anchor in a hypertext document in response to a spoken utterance, the method comprising:
   getting a list of all nodes with links in the hypertext document being displayed by the browser by using a programmatic interface provided by the browser;
   for each node in the list of all nodes
      getting a destination anchor for the node;
      if the destination anchor exists, forming an associated utterance by recursively collecting text from subnodes of the node;
      traversing parent nodes of the node and accumulating position offsets to obtain a position of the node;
      registering the associated utterance, the destination anchor, and the position of the node with a speech recognition engine; and
      marking the position of the node as relative to a container node if the container node is a parent node of the node, otherwise marking the position of the node as absolute;
   receiving the spoken utterance from a user;
   identifying the associated utterance that corresponds to the spoken utterance;
   retrieving the destination anchor associated with the identified associated utterance; and
   directing the browser to the retrieved destination anchor.

6. The article of manufacture of claim 5, wherein forming the utterance further comprises recursively examining the subnodes of the node for alternate text and using the alternate text as the utterance if the collected text is blank.

7. The article of manufacture of claim 5, wherein the parent node is temporarily made visible if the parent node is hidden.

8. The article of manufacture of claim 5, wherein the method further comprises adding a visible tag string in the vicinity of the position of the node and farther registering the visible tag string with the speech recognition engine.

9. A speech recognition system comprising:
   a document parser to get a list of all nodes with links in a document being displayed by a browser by using a programmatic interface provided by the browser;
   a node parser to create a destination anchor for the node and, if the destination anchor exists, to form an associated utterance by recursively collecting text from subnodes of the node, for each node in the list of all nodes;
   a position parser
      to traverse parent nodes of the node,
      to accumulate position offsets to obtain a position of the node, and
      to mark the position of the node as relative to a container node if the container node is a parent node of the node, otherwise to mark the position of the node as absolute;
   a registration engine to register the associated utterance, the destination anchor, and the position of the node with a finite state grammar controller to create a finite state grammar; and
   a speech recognition engine
      to receive a spoken utterance from a user,
      to identify the associated utterance that corresponds to the spoken ufterance using the finite state grammar,
      to retrieve the destination anchor associated with the identified associated utterance, and
      to direct the browser to the retrieved destination anchor.

10. The speech recognition system of claim 9, wherein the node parser is to form the utterance by further recursively examining the subnodes of the node for alternate text and using the alternate text as the utterance if the collected text is blank.

11. The speech recognition system of claim 9, wherein the position parser is further to temporarily make the parent node visible if the parent node is hidden.

12. The speech recognition system of claim 9, further comprising a tag generator to add a visible tag string in the vicinity of the position of the node and the registration engine is further to register the visible tag string with the finite state grammar controller.

* * * * *

UNITED STATES PATENT AND TRADEMARK OFFICE
CERTIFICATE OF CORRECTION

PATENT NO. : 7,313,527 B2  Page 1 of 1
APPLICATION NO. : 10/350484
DATED : December 25, 2007
INVENTOR(S) : Wu It is certified that error appears in the above-identified patent and that said Letters Patent is hereby corrected as shown below:

Column 8, at line 1, delete "farther" and insert --further--.

Signed and Sealed this

Sixth Day of May, 2008

JON W. DUDAS
*Director of the United States Patent and Trademark Office*